United States Patent [19]

December et al.

[11] Patent Number: 5,431,791
[45] Date of Patent: Jul. 11, 1995

[54] CATHODIC ELECTRODEPOSITION METHOD UTILIZING CYCLIC CARBONATE-CURABLE COATING COMPOSITION

[75] Inventors: Timothy S. December, Rochester; Paul J. Harris, West Bloomfield, both of Mich.

[73] Assignee: BASF Corporation, Southfield, Mich.

[21] Appl. No.: 385,018

[22] Filed: Feb. 7, 1995

Related U.S. Application Data

[63] Continuation-in-part of Ser. No. 171,319, Dec. 21, 1993, abandoned.

[51] Int. Cl.6 ............................................. C25D 13/04
[52] U.S. Cl. .................... 204/181.7; 523/404; 523/414; 523/415
[58] Field of Search ................ 204/181.7; 523/414, 523/415, 404

[56] References Cited

U.S. PATENT DOCUMENTS

| | | | |
|---|---|---|---|
| 4,484,994 | 11/1984 | Jacobs, III et al. | 523/414 |
| 4,542,173 | 9/1985 | Schupp et al. | 204/181.7 |
| 4,720,569 | 1/1988 | Tominaga | 560/26 |
| 4,806,611 | 2/1989 | Honel et al. | 528/45 |
| 4,882,391 | 11/1989 | Brindöpke et al. | 525/327.2 |
| 4,892,954 | 1/1990 | Brindopke et al. | 549/229 |

Primary Examiner—John Niebling
Assistant Examiner—Kishor Mayekar
Attorney, Agent, or Firm—Paul L. Marshall

[57] ABSTRACT

An electrodeposition method is described where a conductive substrate is immersed in an electrodeposition coating composition comprising, in an aqueous medium:

A) a resin having a plurality of acid-salted primary amine groups, and

B) a curing agent having a plurality of cyclic carbonate groups.

23 Claims, No Drawings

CATHODIC ELECTRODEPOSITION METHOD UTILIZING CYCLIC CARBONATE-CURABLE COATING COMPOSITION

This application is a continuation-in-part of U.S. patent application Ser. No. 08/171,319 filed Dec. 21, 1993, now abandoned.

FIELD OF THE INVENTION

This invention relates to cathodic electrodeposition methods.

BACKGROUND OF THE INVENTION

Electrodeposition coating compositions and methods are widely used in industry today. During electrodeposition, an ionically-charged resin having a relatively low molecular weight is deposited onto a conductive substrate by submerging the substrate in an electrocoat bath having dispersed therein the charged resin, and applying an electrical potential between the substrate and a pole of opposite charge (usually the walls of the vessel holding the bath). This produces a relatively soft coating on the substrate of low molecular weight resin. This coating is usually converted to a hard high molecular weight coating by curing or crosslinking the resin.

One curing mechanism utilizes a melamine formaldehyde resin curing agent in the electrodepositable coating composition to react with hydroxyl functional groups on the electrodeposited resin. This curing method provides good cure at relatively low temperatures (e.g., 132° C.), but the crosslink bonds contain undesirable ether linkages and the resulting coatings provide poor overall corrosion resitance as well as poor chip and cyclic corrosion resistance.

In order to address some of the problems with melamine-crosslinked electrocoats, many users employ polyisocyanate crosslinkers to react with hydroxyl functional groups on the electrodeposited resin. This curing method provides desirable urethane crosslink bonds, but it also entails several disadvantages. In order to prevent premature gelation of the electrodepositable coating composition, the highly reactive isocyanate groups on the curing agent must be blocked (e.g., with an oxime or alcohol). Blocked polyisocyanates, however, require high temperatures (e.g., 150° C. or more) to unblock and begin the curing reaction. The resulting electrocoats can also be susceptible to yellowing. Moreover, the volatile blocking agents released during cure can cause other deleterious effects on various coating properties, as well as increasing VOC. There is thus a need in the art for electrodepositable coating compositions that could provide desirable urethane crosslink linkages, but avoid the problems that accompany the use of blocked polyisocyanate curing agents. Also, since melamine and polyisocyanate curing agents for hydroxy-functional resins are also used in a variety of coating compositions other than electrocoat, and still entail the same sets of disadvantages, this need is observed throughout the coatings art.

SUMMARY OF THE INVENTION

It has now been found that durable coatings containing desirable urethane crosslink linkages can be obtained with an electrodeposition method is described where a conductive substrate is immersed in an electrodeposition coating composition comprising, in an aqueous medium:

A) a resin having a plurality of acid-salted primary amine groups, and
B) a curing agent having a plurality of cyclic carbonate groups.

DESCRIPTION OF THE PREFERRED EMBODIMENTS

The resin (A) containing primary amine groups can be any of a number of resins known in the art. A variety of such resins are known including epoxy, acrylic, polyester, polyether, polyurethane, polyamide, polybutadiene, and phenolic resins.

In a preferred embodiment, the resin is an epoxy resin, also known as a polyglycidyl ether. The preferred polyglycidyl ethers are polyglycidyl ethers of bisphenol A and similar polyphenols. Useful epoxy resins can have a weight average molecular weight, which can be determined by GPC, of 3000 to 6000. Epoxy equivalent weights can range from 500 to 1900, and preferably from 870 to 1200. Epoxy resins can be prepared, for example by etherifying a polyphenol using an epihalohydrin, such as epichlorohydrin, in the presence of alkali.

Amino groups can be incorporated by reacting the polyglycidyl ethers of the polyphenols with a polyamine containing primary amines. This should be done with an excess of amine so as to provide amine-terminated resins. In a preferred embodiment, the epoxide groups on the polyglycidyl ether are reacted with a compound comprising a secondary amine group and at least one latent primary amine group blocked by a ketimine. Resins used according to the invention preferably have a primary amine equivalent weight of 300 to 3000, and more preferably of 850 to 1300. It may also be advantageous to react some of the reactive epoxide groups with a modified material, such as a polyol or a polycarboxylic acid, in order to improve the film properties.

Acrylic polymers are well-known in the art, and can be prepared from monomers such as methyl acrylate, acrylic acid, methacrylic acid, methyl methacrylate, butyl methacrylate, cyclohexyl methacrylate, and the like. Substituted acrylates and methacrylates, such as hydroxyethyl acrylate, hydroxybutyl acrylate, 2-ethylhexylacrylate, and n-butylacrylate may also be used. Copolymerizable ethylenically-unsaturated comonomers such as styrene may also be included in the polymer. Primary amino groups can be incorporated in acrylic polymers by copolymerization of an amino-containing acrylic monomer, such as methacrylamide or acrylamide.

Polyesters can also be used as the resin in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol). Primary amino groups can be incorporated into polyesters by reacting a carboxylic acid-functional polyester with a molar excess of a primary amine prepolymer.

Polyurethanes can be used as the resin in the present invention. Polyurethanes are well-known in the art, and are prepared by the reaction of a polyisocyanate and a polyol. Examples of useful polyisocyanates include hexamethylene diisocyanate, toluene diisocyanate, MDI, isophorone diisocyanate, and biurets and triisocyanurates of these diisocyanates. Examples of useful polyols include low molecular weight aliphatic polyols, polyester polyols, polyether polyols, fatty alcohols, and the like. Primary amine groups may be incorporated in polyurethanes by capping the polyurethane with an excess of primary amine-containing polyamine or with a compound comprising a secondary amine group and at least one latent primary amine group blocked by a ketimine.

Polyethers can be used as the resin in the present invention. Examples of useful polyethers are those based on propylene oxide and/or polyethylene oxide. As is known in the art, these polyethers can be made to be epoxy or primary amine terminated, and thus incorporated into a bisphenol A-based epoxy resin.

Epoxy-modified Novolacs can be used as the resin in the present invention. The epoxy-novolac can be capped with a compound containing a secondary amine group and at least one primary amine group blocked by a ketimine.

Polybutadiene, polyisoprene, or other epoxy-modified rubber-based polymers can be used as the resin in the present invention. The epoxy-rubber can be capped with a compound containing a secondary amine group and at least one latent primary amine group blocked by a ketimine.

It may be advantageous to include other functional groups, such as hydroxyl groups on any of the above-described resins. These functional groups may serve as reaction sites for optional auxiliary crosslinkers, such as aminoplast resins. Techniques for incorporation of such groups is well-known in the art.

In a preferred embodiment, the primary amine groups are salted with an acid, such as acetic acid, lactic acid, or citric acid. This is particularly useful for aqueous coating compositions, where water-solubility or dispersibility of the resin is required. It is also particularly useful for cathodic electrocoat compositions, where the resin must carry a cationic charge to enable it to be electrodeposited to the cathode of an electrodeposition cell.

The coating composition of the present invention also comprises a component (B) that is a curing agent having a plurality of cyclic carbonate groups. Cyclic carbonate compounds are well-known in the art. The component (B) may comprise cyclic carbonate groups having various ring sizes as are known in the art, such as five-membered cyclic carbonate rings, six-membered cyclic carbonate rings, seven-membered cyclic carbonate rings, or fused ring systems containing the characteristic —O—CO—O—carbonate moiety.

Cyclic carbonate compounds can be synthesized by any of several different approaches. One approach involves reacting an epoxy group-containing compound with $CO_2$, preferably under pressure with a catalyst. Useful catalysts include any that activate an oxirane ring, such as tertiary amine quaternary salts (e.g., tetramethyl ammonium bromide), tin and/or phosphorous complex salts (e.g., $(CH_3)_3SNI$, $(CH_3)_4PI$). Epoxides can also be reacted with β-butyrolactone in the presence of such catalysts. In another approach, a glycol like glycerine is reacted at temperatures of at least 80° C. (usually under reflux) with diethyl carbonate in the presence of a catalyst (e.g., potassium carbonate) to form a cyclic carbonate. Alternatively, a functional compound containing a ketal of a 1,2-diol having the structure:

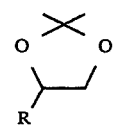

can be ring-opened with water at temperatures of at least 60° C., preferably with a trace amount of acid, to form a 1,2-glycol. As an alternative to reaction with diethyl carbonate, glycols can be reacted with phosgene in the presence of sodium hydroxide to form a cyclic carbonate. Five-membered cyclic carbonate rings can be formed from 1,2-glycols. Six-membered cyclic carbonate rings can be formed from 1,3-glycols. Fused rings may be formed, for example, by the reaction of phenol with phosgene to form phenylene carbonate.

Cyclic carbonates typically have 5–6-membered rings, as is known in the art. Five-membered rings are preferred, due to their ease of synthesis and greater degree of commercial availability.

In a preferred embodiment, compounds useful as component (B) are prepared by reaction of a polyepoxide with carbon dioxide to convert the epoxy groups to cyclic carbonate groups. Polyepoxides are well-known in the art. Polyepoxides useful for preparing component (B) compounds include the trimethylol propane that has been epoxidized by reaction with an epihalohydrin, and also epoxy-novolacs. Oligomeric or polymeric polyepoxides, such as acrylic polymers or oligomers containing glycidyl methacrylate or epoxy-terminated polyglycidyl ethers, can also be used. Other polyepoxides, e.g., epoxy-novolacs, may also be used. As with other polyepoxides, epoxy-novolacs can be reacted with carbon dioxide to form the cyclic carbonate crosslinker.

Cyclic carbonates with a functionality higher than 3 are also contemplated and, in many cases, are preferred. For example, the isocyanate groups on a diisocyanate such as isophorone diisocyanate may be adducted with a polyol such as trimethylol propane to produce a tetrafunctional alcohol, which can be epoxidized with an epihalohydrin to produce a tetrafunctional polyepoxide, which is in turn reacted with carbon dioxide to form a tetrafunctional cyclic carbonate. Other higher-functionality polyepoxides, e.g., tetrakis(4-glycidyloxyphenyl)ethane, may also be reacted with CO2 to form poly-cyclic carbonates. Even substantially higher functionalities can be used, such as polymeric polyepoxides converted to polymeric cyclic carbonate compounds, where the functionality will be a function of the equivalent weight of the polymer.

One preferred class of cyclic carbonate compounds useful as component (B) are compounds having at lease one polyether segment and/or at at least four cyclic carbonate groups. In another preferred embodiment, each cyclic carbonate group is appended to a polyether segment. Such cyclic carbonate compounds may be prepared by reacting a polyether polyol with an epihalohydrin to convert the hydroxyl groups to epoxy groups. The epoxy groups may then be converted to cyclic carbonate groups by reaction with $CO_2$, as described above. Examples of useful polyether polyols include compounds of the formula:

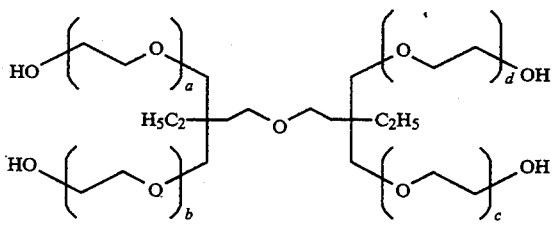

where a+b+c+d=3 or where a+b+c+d=5 or where a+b+c+d=7.

One route for the preparation of cyclic ring carbonates can be represented by the formula:

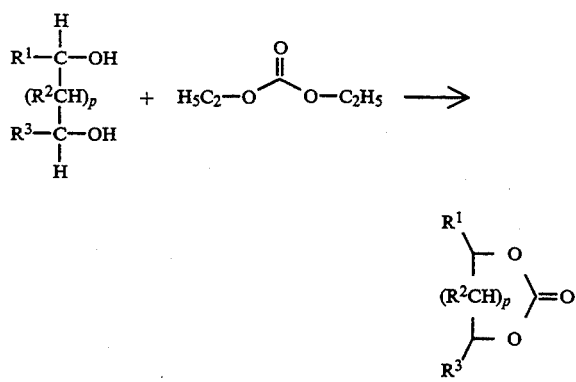

where p is 0 or a positive integer (preferably 0, 1, or 2) and $R^1$, $R^2$, and $R^3$ are each independently H or an organic radical with the proviso that at least one of $R^1$, $R^2$ and $R^3$ is an organic radical to which other cyclic carbonate groups can be attached or a group capable of bonding to an organic radical to which other cyclic carbonate groups can be attached.

In one preferred embodiment of the invention, component (B) compounds are represented by the formula:

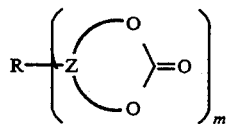

where R represents an organic radical, Z represents the carbon atoms necessary to complete a substituted or unsubstituted five-, six-, or seven-membered cyclic carbonate ring, and m represents an integer of at least 2.

In another preferred embodiment of the invention, component (B) compounds are represented by the formula:

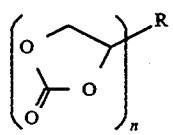

where R represents an organic radical and n is 2 to 8, preferably 2 to 6, and more preferably 3 or 4.

The water-dispersible resins useful in cathodic electrodeposition should be neutralized to a degree sufficient to prevent premature reaction of unsalted amino groups with the cyclic carbonate groups on component (B) from adversely affecting the properties of the coating bath (typically at least 80%, and more preferably 90–100%).

In order to enhance various film properties, the water-dispersible resins are often used in the form of an emulsion in which the water-dispersible resin constitutes a continuous phase, and an optional water-insoluble resin free from chargeable hydrophilic groups (e.g., an epoxy acrylate resin) constitutes a dispersed phase.

The electrodepositable coating compositions used in the practice of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 10 to 40 percent by weight resin solids. Aqueous resin concentrates which are to be further diluted with water, generally range from 10 to 30 percent by total weight solids.

The above components are uniformly dispersed in an aqueous medium containing an acid in an amount sufficient to neutralize enough of the amine groups to impart water-dispersibility to the resin. Examples of useful acids include phosphoric acid, acetic acid, propionic acid, citric acid, and lactic acid.

Besides water, the aqueous medium of an electrocoat composition may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene, glycolethylcellosolve, propylcellosolve, butylcellosolve, ethyleneglycol dimethyl ether, or diacetone alcohol. A small amount of a water-immiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

The electrodeposition coating composition may further contain conventional pigments such as titanium dioxide, ferric oxide, carbon black, aluminum silicate, precipitated barium sulfate, aluminum phosphomolybdate, strontium chromate, basic lead silicate or lead chromate. The pigment-to-resin weight ratio can be important and should be preferably less than 50:100, more preferably less than 40:100, and usually about 20 to 40:100. Higher pigment-to-resin solids weight ratios have also been found to adversely affect coalescence and flow.

The electrodeposition coating compositions can contain optional ingredients such as wetting agents, surfactants, defoamers, antioxidants, UV absorbers, light stabilizers, and so forth. Examples of surfactants and wetting agents include alkyl imidazolines such as those available from Ciba-Geigy Industrial Chemicals as Amine C®, acetylenic alcohols available from Air Products and Chemicals as Surfynol® 104. These optional ingredients, when present, constitute from about 0 to 20 percent by weight of resin solids. Plasticizers are optional ingredients because they promote flow. Examples are high boiling water immiscible materials such as ethylene or propylene oxide adducts of nonyl phenols or bisphenol A. Plasticizers can be used and if so are usually used at levels of about 0 to 15 percent by weight resin solids.

In general, sufficient water is added so that the dispersion has a solids content of more than 20, preferably more than 30% by weight.

The electrodeposition coating composition should have an electroconductivity from 0.1 to 5 mS/cm, preferably from 0.5 to 3 mS/cm. When this value is too low, it is difficult to obtain a film thickness having desired protective and other functions. Conversely, if the composition is too conductive, problems such as the dissolution of substrate or counter electrode in the bath, uneven film thickness or poor water or corrosion resistance may arise.

The electrodeposition coating composition used in this invention may be applied on a conductive substrate by the electrodeposition coating process at a nonvolatile content of 10 to 25% by weight to a dry film thickness of 15 to 35 microns. After application, the coating may be cured at ambient or an elevated temperature, depending upon the nature of particular base resins.

Electrodeposition of the coating preparations according to the invention may be carried out by any of a number of processes known to those skilled in the art. The deposition may be carried out on all electrically conducting substrates, for example metal, such as steel, copper, aluminum and the like.

According to the invention, a pigmented resin coating and optionally a clearcoat layer may be applied over the electrocoat primer layer. In automotive applications, the pigmented resin layer is often called a basecoat or pigmented basecoat. The resin in the pigmented resin layer can be of a number of resins known in the art. For example, the resin can be an acrylic, a polyurethane, or a polyester. Typical pigmented resin coating formulations are described in U.S. Pat. Nos. 4,791,168, 4,414,357, and 4,546,046, the disclosures of which are incorporated herein by reference. In one preferred embodiment, the resin is an ε-caprolactone-modified acrylic resin, as described in U.S. Pat. No. 4,720,528, the disclosure of which is incorporated herein by reference. The pigmented resin can be cured by any of the known mechanisms and curing agents, such as a melamine polyol reaction (e.g., melamine cure of a hydroxy-functional acrylic resin).

Other pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

After an article is electrocoated according to the present invention, it is subjected to conditions so as to cure the coating layers. Although various methods of curing may be used, including curing at ambient conditions, heat-curing is preferred because it has added benefits, such as driving off residual water from the coating bath. Generally, heat curing is effected by exposing the coated article to elevated temperatures provided primarily by radiative heat sources. Curing temperatures will vary depending on the particular blocking groups used in the cross-linking agents, however they generally range between 90° C. and 200° C., preferably between 121° C. and 162° C., and most preferably between 121° C. and 141° C. The curing time will vary depending on the particular components used, and physical parameters such as the thickness of the layers, however, typical curing times range from 15 to 60 minutes.

The invention is further described in the following examples.

Preparation 1—Primary Amine Functional Resin 1504 parts by weight (4 moles) of the diglycidylether of bisphenol A, 684 parts (3 moles) of bisphenol A, and 243 parts xylene were added to a 5 liter four neck round bottom flask. The mixture was heated to 130° C. and 2.2 parts triphenylphosphine were added. The reaction was then heated to 150° C. and this temperature was maintained for 90 minutes. 308 parts xylene and 154 parts ethyleneglycol monobutyl ether were added to cool the reaction to 100° C. 571.5 parts of the diketimine of diethylene triamine (4.5 equivalents nitrogen) and 37.6 parts methylethanolamine (0.5 moles) were then added. The temperature was then maintained for 1 hour at 110° C. The meq nitrogen is 1.36 meq N/g solid resin and the amine equivalent weight is 735 grams/eq Nitrogen.

Preparation 2—Pigment Grind Resin

To a 12 l flask, the following materials were added: 2125 grams of the diglycidylether of bishenol A, 644 grams of bisphenol A, 370 grams of dodecylphenol and 162 grams of xylene. The mixture was heated to 1250° C., and 3.1 grams of triphenylphosphine were added. The reation temperature was increased to 130° C. and maintained for 3 hours. The reaction was cooled by the addition fo 795 grams ethylene glycol monobutyl ether and 1907 grams of propyleneglycol glycidyl ether. The remaining epoxy was capped by the addition of 218 grams of 2-aminoethoxyethanol and 173 grams of dimethyaminopropylamine. The temperature was maintained at 110° C. for 4 hours. The temperature was then decreased to 70° C. and 164 grams acetic acid, and 1439 grams of deionized water were added. In a separate vessel, the resulting resin was diluted with 6000 grams of deionized water.

Preparation 3—Pigment Grind Paste

To an appropriate vessel, the following were added: 10,700 grams of grind resin, 325 grams carbon black, 542 grams dibutyltin oxide, 379 grams lead silicate, 1625 grams clay, 8504 grams titanium dioxide, and 2574 grams deionized water. These ingredients were mixed under a high shear and then milled. The paste was then diluted with 2000 grams of deionized water.

Preparation 4—Carbonate Crosslinker

Trimethylolpropanetriglycidylether, 500 g, was dissolved in isobutanol, 200 g, and the catalyst, tetra-n-butylammonium bromide, 10 g, was added. This mixture was heated to 100° C. and a steady stream of carbon dioxide gas was bubbled through the reaction mixture. The extent of reaction was monitored both by infrared spectroscopy and by epoxide titration. When the reaction had proceeded to greater than 95%, as determined by titration, the gas flow was stopped. This yielded a tri-cyclic carbonate crosslinker.

Preparation 5—Carbonate Crosslinker

Trimethylolpropanetriglycidylether, 500 g, was dissolved in iso-butanol, 200 g, and the catalyst, tetra-n-butylammonium bromide, 10 g, was added. This mixture was heated to 100° C. and the reactor purged with a steady stream of carbon dioxide gas. After ten to twenty minutes, the system was sealed and carbon dioxide gas was introduced to a pressure of 130 psi. This pressure was maintained throughout the reaction. The extent of reaction was monitored both by infrared spectroscopy and by epoxide titration. When the reaction had proceeded to greater than 98%, as determined by titration, the system was cooled and brought to atomsopheric presssure. This yielded a tri-cyclic carbonate crosslinker.

Examples 1-2

264 parts by weight of the amine functional resin from Preparation 1 was neutralized with 15.3 parts by weight of acetic acid. 55 parts by weight of the carbonate crosslinker from either Preparation 4 (Example 1) or Preparation 5 (Example 2), and 21 parts of a polypropylene oxide adduct with p-cresol were then added and mixed. Additionally, 2 parts of a polyvinylalkylether and 1 parts of a nonionic surfactant defoamer were added. This salted resinous mixture was held under high agitation while 577 parts of deionized water were added slowly to complete the emulsification. The pH of the emulsion was 6.0 and the particle size was 162 nm.

343 parts of this emulsion and 106 parts deionized water were mixed, and then 52 parts of pigment paste from Preparation 3 were added to make an electrocoat bath. The bath solids were 20%. The pH was 6.67 and the conductivity was 4670 µS.

A steel test panel was immersed in the electrocoat bath, and current was applied to electrodeposit a 15 µm coating. This coating was cured for 30 minutes at 110° C. to form a hard durable electrocoat primer coating.

The invention has been described in detail with reference to particular embodiments thereof. It is understood that modifications and variations may be made within the spirit and scope of the invention.

What is claimed is:

1. A cathodic electrodeposition method comprising the steps of:
   1) immersing a conductive substrate in a coating composition comprising, in an aqueous medium:
      A) a resin having a plurality of acid-salted primary amine groups, and
      B) a curing agent having a plurality of cyclic carbonate groups,
   2) applying a potential of electric current between an anode and the conductive substrate, and
   3) removing the substrate from the coating composition.

2. An electrodeposition method according to claim 1 wherein the resin (A) is an epoxy resin.

3. An electrodeposition method according to claim 1 wherein the resin (A) is the acid-salted reaction product of:
   a) a polyepoxide resin and
   b) a compound comprising a secondary amine group and at least one latent primary amine group blocked by a ketimine.

4. An electrodeposition method according to claim 3 wherein the polyepoxide resin is a polyglycidyl ether of a polyphenol.

5. An electrodeposition method according to claim 3 wherein the compound (b) has one secondary amine group and two latent primary amine groups blocked by ketimine.

6. An electrodeposition method according to claim 2 wherein the epoxy resin has an epoxy equivalent weight of 500 to 1900.

7. An electrodeposition method according to claim 3 wherein the polyepoxide resin has an epoxy equivalent weight of 500 to 1900.

8. An electrodeposition method according to claim 4 wherein the polyepoxide resin has an epoxy equivalent weight of 500 to 1900.

9. An electrodeposition method according to claim 1 wherein the resin (A) has a primary amine equivalent weight of 300 to 3000.

10. An electrodeposition method according to claim 2 wherein the resin (A) has a primary amine equivalent weight of 300 to 3000.

11. An electrodeposition method according to claim 3 wherein the cationic resin has a primary amine equivalent weight of 300 to 3000.

12. An electrodeposition method according to claim 1 wherein the curing agent (B) is the reaction product of a polyepoxide and carbon dioxide.

13. An electrodeposition method according to claim 12 wherein the polyepoxide is a triepoxide.

14. An electrodeposition method according to claim 12 wherein the polyepoxide is a tetraepoxide.

15. An electrodeposition method according to claim 14 wherein the polyepoxide comprises one or more polyether segments.

16. An electrodeposition according to claim 15 wherein each epoxide group on the polyepoxide is appended to a polyether segment.

17. An electrodeposition according to claim 12 wherein each epoxide group on the polyepoxide is appended to a polyether segment.

18. An electrodeposition method according to claim 1 wherein the curing agent (B) comprises at least four cyclic carbonate groups.

19. An electrodeposition method according to claim 1 wherein the curing agent (B) comprises one or more polyether segments.

20. An electrodeposition according to claim 19 wherein each cyclic carbonate group on the curing agent (B) is appended to a polyether segment.

21. An electrodeposition according to claim 1 wherein each cyclic carbonate group on the curing agent (B) is appended to a polyether segment.

22. An electrodeposition method according to claim 12 wherein the polyepoxide is the reaction product of a polyol and an epihalohydrin.

23. An electrodeposition coating composition comprising, in an aqueous medium:
   A) a resin having a plurality of acid-salted primary amine groups, and
   B) a curing agent having a plurality of cyclic carbonate groups.

* * * * *